US006109986A

United States Patent [19]

Gaynor et al.

[11] Patent Number: 6,109,986

[45] Date of Patent: Aug. 29, 2000

[54] IDLE SPEED CONTROL SYSTEM FOR A MARINE PROPULSION SYSTEM

[75] Inventors: Phillip K. Gaynor, Fond du Lac; Edwin B. Hatch, West Bend; Jeffery C. Ehlers, Neenah, all of Wis.

[73] Assignee: Brunswick Corporation, Lake Forest, Ill.

[21] Appl. No.: 09/208,693

[22] Filed: Dec. 10, 1998

[51] Int. Cl.[7] .......... B60K 41/00

[52] U.S. Cl. .......... 440/87; 440/1; 123/336

[58] Field of Search .......... 440/1, 87, 88, 440/75, 111; 123/336, 339.19, 416

[56] References Cited

U.S. PATENT DOCUMENTS

| | | | |
|---|---|---|---|
| 4,337,742 | 7/1982 | Carlson | 123/339 |
| 4,359,983 | 11/1982 | Carlson | 123/339 |
| 5,070,803 | 12/1991 | Smith | 114/145 |
| 5,305,701 | 4/1994 | Wilson | 114/145 |
| 5,362,263 | 11/1994 | Petty | 440/1 |
| 5,364,322 | 11/1994 | Fukui | 477/108 |
| 5,586,535 | 12/1996 | Syomura | 440/87 |
| 5,765,528 | 6/1998 | Kamimaru | 123/339.19 |

*Primary Examiner*—Jesus D. Sotelo
*Attorney, Agent, or Firm*—William D. Lanyi

[57] ABSTRACT

An idle speed control system for a marine propulsion system controls the amount of fuel injected into the combustion chamber of an engine cylinder as a function of the error between a selected target speed and an actual speed. The speed can be engine speed measured in revolutions per minute or, alternatively, it can be boat speed measured in nautical miles per hour or kilometers per hour. By comparing target speed to actual speed, the control system selects an appropriate pulse with length for the injection of fuel into the combustion chamber and regulates the speed by increasing or decreasing the pulse width.

24 Claims, 7 Drawing Sheets

IDLE SPEED CONTROL SYSTEM FOR A MARINE PROPULSION SYSTEM

BACKGROUND OF THE INVENTION

1. Field of the Invention

The present invention is generally related to an idle speed control system for an internal combustion engine and, more particularly, to a system that maintains the idle speed of an engine according to a predetermined plan which controls the engine speed as the function of the difference between a target speed or RPM and an actual speed of the boat or RPM of the engine, respectively.

2. Description of the Prior Art

Those skilled in the art of internal combustion engines are aware of many different types of speed control systems used to control the operation of the engine. For example, in automotive applications, the cruise control function has been available for many years. However, in marine propulsion systems, idle speed control is not generally available because the operating conditions relating to the use of a marine propulsion system are significantly different from automotive applications.

Unlike automotive applications of speed control systems, marine applications can experience variable conditions that operate to defeat the intent of maintaining a constant speed. For example, if the operating speed (RPM) of a marine engine is maintained at a constant magnitude, the marine vessel may experience changes in wind direction or water current direction which will change the boat speed even though the engine speed, measured in RPM, remains constant. Therefore, the relationship between boat speed and engine RPM in a marine application is not as generally predictable as in an automotive application.

The operator of a marine vessel occasionally desires to operate the vessel at a precise idle speed in order to fish in a manner that is commonly referred to as trolling. In trolling applications, the boat operator typically desires to maintain a constant boat speed regardless of wind direction and strength and regardless of the direction or strength of water currents. In order to maintain the constant boat speed, it may be necessary to frequently change the actual engine speed, measured in revolutions per minute.

U.S. Pat. No. 5,364,322 which issued to Fukui on Nov. 15, 1994, describes a control apparatus for a marine engine. The control apparatus is capable of effectively suppressing a great variation in the rotational speed of the engine due to a great variation in an intake air pressure particularly when the engine is trolling. In one form, an air/fuel ratio of a mixture supplied to the engine is made constant to maintain engine output power at a constant level. In another form, the intake air pressure, based on which the engine is controlled, is averaged in such a way as to reduce a variation in the engine rotational speed by using a greater averaging coefficient during trolling than at other times. In a further form, if a variation in the intake air pressure is less than a predetermined value, the intake air pressure is used controlling the engine, whereas if otherwise, another engine operating parameter such as an opening degree of a throttle valve is used instead of the intake air pressure.

U.S. Pat. No. 5,362,263 which issued to Petty on Nov. 8, 1994, describes a trolling autopilot for a vessel for use in combination with a depth finder having a transducer, including a means for setting and storing a desired characteristic to be followed by the vessel. It further includes means for measuring the characteristic to be followed by the vessel and means for storing a signal generated by the measuring means indicative of the measured characteristic. Once received and stored, the measured characteristic is compared to the selected characteristic. Based upon the comparison between the two characteristics, at least one servo motor is actuated to alter the direction the vessel is traveling. The servo motor may be coupled to the helm or to an outboard motor mounted to the vessel. The speed of the vessel may also be controlled based upon a comparison between a measured value and a selected value.

U.S. Pat. No. 5,070,803 which issued to Smith on Dec. 10, 1991, discloses a method and apparatus for reducing the trolling speed of boats having inboard engines. The apparatus for slowing the trolling speed of boats having a steerable rudder mounted under the stem of the boat aft of a propeller driven by the inboard engine includes a mechanical structure. The rudder has first and second opposed major sides and has first and second deflector plates carried on opposite sides of the rudder. The deflector plates are movable between the first, closed position wherein the first and second deflector plates reside closely adjacent to and substantially along the respective first and second major sides of the rudder and are substantially inoperative and a second, open position wherein the first and second deflector plates extend outwardly away from the opposed sides of the rudder into the wash from the propeller and are operative to create speed reducing drag to slow the forward movement of the boat.

U.S. Pat. No. 5,305,701, which issued to Wilson on Apr. 26, 1994, describes a device for controlling boat speed. The invention relates to attachments to the anticavitation plate of a boat motor for making and controlling small variations in boat speed below the normal motor idling speed to facilitate trolling for fish. The trolling speed control includes an incrementally adjustable unitary plate mounted for movement between a position fully across the normal paths of the propeller wash, thereby to slow the speed of the boat and to a fully retracted position out of the path of the propeller wash. This invention relates to a motorboat low speed control device.

In certain types of internal combustion engines which utilize homogenous combustible gaseous mixtures, it may also be necessary to provide a means for providing the internal combustion engine with an appropriate amount of air during operation at idle speeds. The amount of air provided to the internal combustion engine should be regulated in conformance with the amount of fuel provided to it. In the automotive field, this function is performed by idle air control devices.

U.S. Pat. No. 4,359,983, which issued to Carlson et al on Nov. 23, 1982, describes an engine idle air control valve with a position counter reset apparatus. A vehicle is driven by an internal combustion engine having an air induction passage with an idle air control valve positionable by a stepping motor in response to valve opening and valve closing pulses. A counter normally counts the pulses arithmetically to provide an indication of valve position. In order to bring the counter and valve position into accord, counter reset apparatus is effective, when actuated, to generate a predetermined number of valve closing pulses sufficient to stall the stepping motor against the stop, reset the counter to a predetermined reference count and generate a predetermined number of valve opening pulses to return the idle air return valve to a desired operating position with the counter counting such pulses in the normal manner. The apparatus is actuated upon the first occurrence of a vehicle speed greater than a predetermined speed such as 30 mph following a counter reset signal, which signal is generated upon each engine start and may further be generated at any time a counter error is detected. The minimum required vehicle speed guarantees that the engine will not stall during the period of the reset operation.

U.S. Pat. No. 4,337,742, which issued to Carlson et al on Jul. 6, 1982, describes an idle air control apparatus for an internal combustion engine. The apparatus for a vehicle driving internal combustion engine having an air induction passage includes a control valve in the air induction passage controlled by a stepper motor in response to the arithmetic count of applied electrical pulses, a register effective to store a valve control number representing the currently desired position of the control valve, apparatus effective upon occurrence of a predetermined engine loading event to change the valve control number in response thereto, an up-down counter effective to arithmetically count the pulses applied to the stepper motor and thus indicate actual control valve operation, a closed loop control effective to compare the contents of the up-down counter and register and apply pulses to the stepper motor at the first predetermined rate in order to reduce any difference therebetween and a speed trim loop active only during occurrence of a predetermined steady state idle condition to compare actual engine speed with the desired engine idle speed and arithmetically change the valve control number in the register at a second predetermined rate substantially slower than the first predetermined rate in order to reduce any difference between the speeds. Therefore, idle air control responds to large, sudden engine load changes and environmental factors to prevent engine stall but ignores small random speed fluctuations to maintain a stable engine idle speed.

U.S. patent application Ser. No. 08/939,829 (M09190) which was filed on Sep. 29, 1997 by Ehlers et al and assigned to the assignee of the present application, discloses an internal combustion engine with barometric pressure related start of air compensation for a fuel injector. The control system for a fuel injector system is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

The patents and patent application described above are hereby explicitly incorporated by reference in this description.

In view of the differences in operation between internal combustion engines used in automotive applications and those used in marine applications, it would be significantly beneficial if a control system could be developed which is able to maintain the boat speed at a constant magnitude regardless of the changing effects of wind and water currents.

SUMMARY OF THE INVENTION

An engine control system made in accordance with the present invention comprises a means for measuring actual speed. If the control parameter is boat speed, the measuring rate means can be a speedometer such as the type using a pitot tube or the type of speedometer which uses a paddle wheel. If the controlled parameter is engine speed, the measuring means can be a tachometer which measures the revolutions per minute (RPM) of the engine. A preferred embodiment of the present invention further comprises a means for receiving a desired speed magnitude as a target speed. In a typical application of the present invention, the receiving means is an operator interface, such as one or more push buttons that a boat operator can depress to enter a desired boat speed (MPH) or engine RPM into the control system.

The control system of the present invention further comprises a means for comparing the actual speed to the desired speed magnitude in order to determine an error magnitude. The error magnitude can be calculated by subtracting the desired engine speed from the actual engine speed or, alternatively, by subtracting the desired boat speed from the actual boat speed. The present invention further comprises a means for controlling a fuel supply to the engine as the function of the error magnitude. As will be described in greater detail below, the engine control unit (ECU) uses the error magnitude to determine a quantity of fuel to be injected into a combustion chamber of the engine for each injection cycle of the engine.

If the internal combustion engine utilizes a stratified charge combustion system, the engine idle speed can be controlled adequately by determining the proper amount of fuel to be injected into the combustion chamber for each injection cycle. If, on the other hand, the internal combustion engine operates in a homogenous mode, it may also be necessary to control the amount of idle air intake that flows into the engine.

The desired speed magnitude received from the operator interface can be an engine speed magnitude measured in revolutions of the engine crankshaft per unit of time (e.g. RPM). Alternatively, the desired speed magnitude received by the operator interface can be a boat speed magnitude measured in a distance traveled by the boat per unit time (e.g. MPH). The present invention contemplates several embodiments. In one embodiment, if the operator enters an RPM value, the engine is controlled by comparing the desired RPM to the actual RPM. If, on the other hand, the operator enters a desired boat speed magnitude, the control system can compare the actual boat speed directly to the desired boat speed and calculate an error which is then used to determine the proper amount of fuel to be injected upon each fuel injection cycle of the engine. Another mode of operation within the scope of the present invention is to receive a desired boat speed from the operator interface and then convert that boat speed to a hypothetical engine speed which is then used as the control variable which is compared to the actual engine speed to determine the amount of fuel to be injected upon each fuel injection cycle of the engine. However, this third method described immediately above is not the most preferable method to practice the present invention. The conversion of boat speed to engine speed must be done as an approximation since it is impossible to determine the true relationship between boat speed and engine RPM which would be suitable for operation of the marine vessel under all conditions of wind and water currents.

The present invention is applicable for use with internal combustion engines that incorporate a fuel injection system. The fuel injection system can be a direct fuel injection (DFI) system which causes fuel to be injected directly into the combustion chamber of the engine. It can also be used in a fuel injection system in which fuel is injected, as a mist, into the air stream of the intake manifold upstream from the intake valve of the combustion chamber. In the application with a direct fuel injection (DFI) engine, the charge is typically stratified and, therefore, the rate of air flow into the engine need not be changed by the engine idle speed control system. However, in engines which use a homogenous charge, such as a fuel injected four cycle engine, it is often necessary to change the rate of idle air flow to correspond properly with changes in the rate of fuel injection into the engine.

Operation of the engine idle control system of the present invention performs a method for controlling the idle speed of the engine of a marine propulsion system by measuring the actual speed, receiving a desired speed magnitude, comparing the actual speed to the desired speed magnitude to determine an error magnitude, and controlling a fuel supply to the engine as a function of the error magnitude. The measuring step would typically use a speedometer, such as a pitot tube or paddle wheel type of speedometer. Alternatively, it could use a tachometer to measure the rotational speed of the engine. The receiving step would typically incorporate an operator interface, such as a plurality of push buttons. The speed magnitude, such as boat speed or engine speed, could be entered by the operator of the marine vessel through the use of the operator interface keypad. The comparing step subtracts the desired speed from the actual speed in order to determine an error magnitude between these two parameters. The error magnitude is then used by the controlling step to determine the proper quantity of fuel to be supplied to the engine during each cycle of the fuel injection system.

BRIEF DESCRIPTION OF THE DRAWINGS

The present invention will be more completely and fully understood from a reading of the description of the preferred embodiment in conjunction with the drawings, in which.

DESCRIPTION OF THE PREFERRED EMBODIMENT

Figure 1:
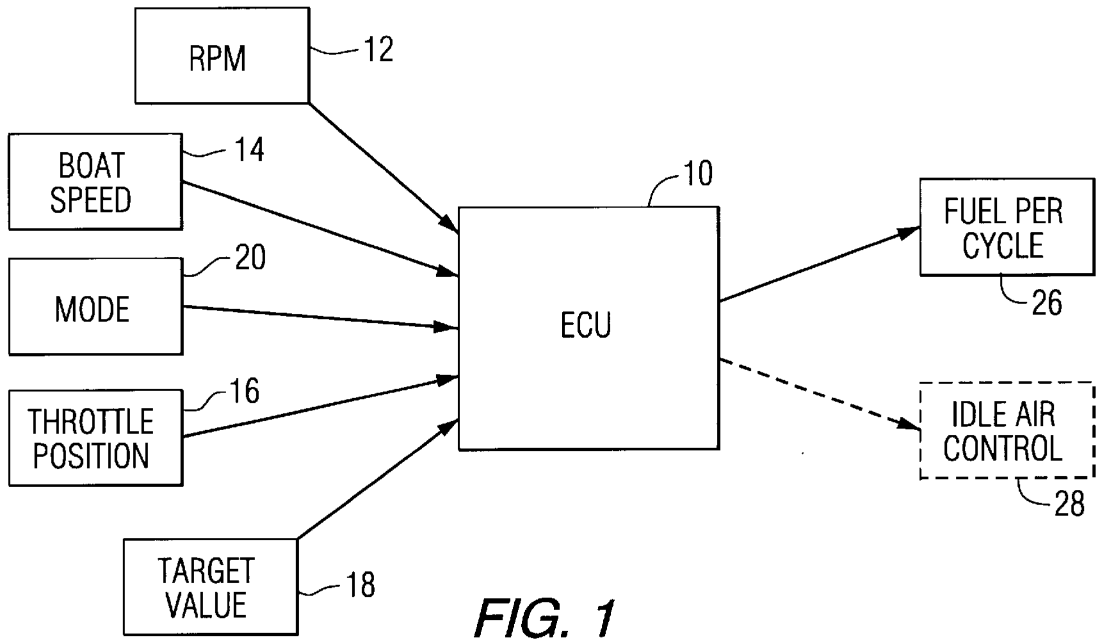
FIG. 1 is a simplified schematic of a control scheme used in a preferred embodiment of the present invention.

Throughout the description of the preferred embodiment, like components will be identified by like reference numerals.

FIG. 1 is a schematic representation of an engine control unit (ECU) 10 with its inputs and outputs in a preferred embodiment of the present invention. The inputs to the engine control unit 10 include a tachometer to provide the engine speed (RPM) 12, a speedometer to provide the boat speed 14, a throttle position sensor to provide the throttle position 16, and an operator interface which provides the target value 18 and mode of operation 20 to the engine control unit 10. These inputs will be described in greater detail below, but FIG. 1 illustrates the general configuration and the types of input parameters used by the engine control unit in order to provide the advantages of the present invention. The outputs controlled by the engine control unit 10 include the fuel per cycle (FPC) 26 which describes the quantity of fuel to be injected into the combustion chamber for each cycle of the fuel injection system. In certain types of engines, such as four cycle engines, the combustible charge is homogenous rather than stratified. If the charge is homogenous, the engine control unit 10 can also provide for idle air control 28 which will be described in greater detail below.

Figure 2:
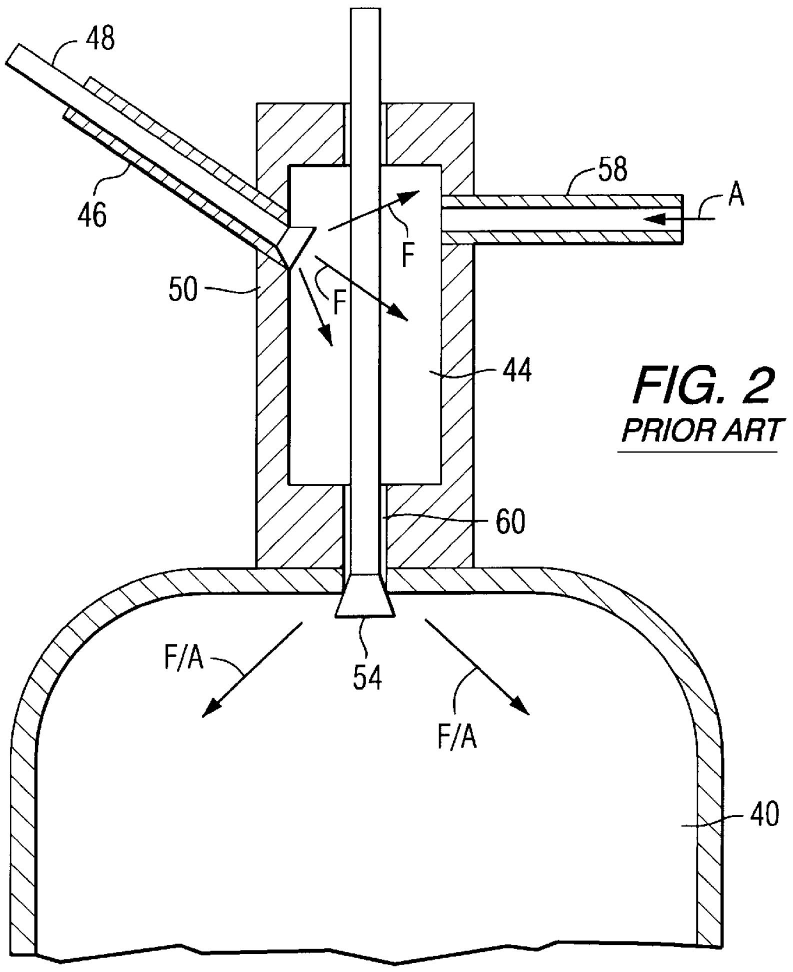
FIG. 2 PRIOR ART
FIG. 2 is a cross sectional view of a fuel injector and combustion chamber.

FIG. 2 represents a single cylinder of a two cycle internal combustion engine. The combustion chamber 40 is typically located within the cylinder of the engine at a region beyond the maximum travel of a piston which reciprocates within the cylinder. Fuel F is injected into a cavity 44 of a fuel injector 50 through a fuel conduit 46 by movement of rod 48. When the rod 48 moves to open the passage, fuel F flows into the cavity 44 of the fuel injector 50. If valve 54 is closed, the fuel remains within the cavity 44. High pressure air A is provided through conduit 58 and flows into the cavity 44. In one typical application of a fuel injection system, the air A is provided at a pressure of approximately 80 psi and the fuel F is provided at approximately 90 psi. The pressure within the cavity 44 is generally maintained at approximately 80 psi except for undulations in pressure magnitude resulting from movement of valve 54 to allow the fuel air mixture F/A to flow into the combustion chamber 40 through conduit 60 when the valve 54 is moved downward in FIG. 2. The fuel injector schematically represented in FIG. 2 is generally known to those skilled in the art and provides one type of direct fuel injection (DFI) system.

With continued reference to FIG. 2, it can be seen that rod 48 slides within conduit 46 to open the passage and allow fuel F to flow into the cavity 44. The duration of time during which rod 48 opens the passage of conduit 46 will directly affect the quantity of fuel flowing through conduit 46 into cavity 44 during the fuel injection cycle prior to the injection of the fuel/air mixture into the combustion chamber 40.

In order to clearly understand one preferred embodiment of the present invention, it is necessary to understand the sequence of operations of the components illustrated in FIG. 2. With valve 54 closed, air A flows through conduit 58 and maintains the pressure within cavity 44 at approximately 80 psi. Upon command from the engine control unit, rod 48 moves downward and towards the right within the conduit 46 to allow fuel F to flow into cavity 44. The fuel is provided at a pressure of approximately 90 psi in order to allow the fuel to flow into the cavity 44 which is maintained at approximately 80 psi. After the fuel is injected into cavity 44, valve 54 opens to allow the pressurized fuel/air mixture to flow into the combustion chamber 40. Therefore, the quantity of fuel in cavity 44 is controlled by the time during which rod 48 opens the passage of cavity 46 and allows fuel to flow into the cavity 44. That time period determines the amount of fuel F in the cavity 44 when valve 54 opens.

Figure 3:
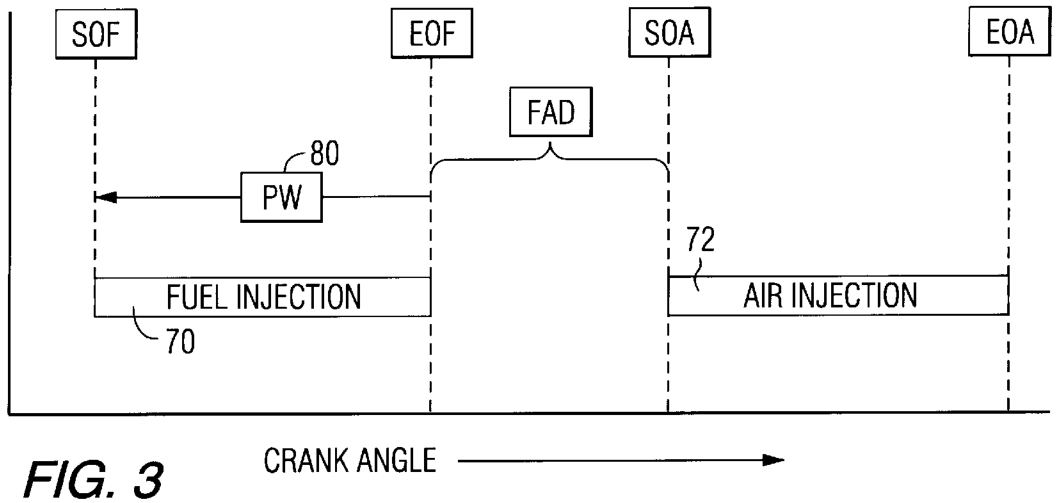
FIG. 3 is a time graph showing fuel injection, air injection and a fuel after air delay between the two injection periods.

FIG. 3 is a graphical representation of the procedure described immediately above in conjunction with FIG. 2. In one particular application of the present invention, the end of the fuel injection event 70 is identified as the end of fuel (EOF) point and is represented as a particular angle of rotation of the engine's crankshaft. Therefore, the end of fuel (EOF) point is typically specified as a crank angle. Similarly, the start of air (SOA) and end of air (EOA) points are also typically specified as crank angles. The difference between the start of air (SOA) and end of air (EOA) points defines the air injection period 72. It should be understood that the air injection period 72, which is measured in degrees of crankshaft rotation, can last for varying periods of time because the engine speed, measured in revolutions per minute, will determine the time during which valve 54 is opened. Although the start of air (SOA) and end of air (EOA) points are identified as crank angles, changes in the engine speed will change the actual time period of the air injection period 72. The pulse width (PW) 80 is specified as a time period, measured in milliseconds. The pulse width (PW) 80 determines the actual quantity of fuel per cycle (FPC) injected for each fuel injection event. Since the pulse width (PW) 80 is specified as a time period, and the end of fuel (EOF) is specified as a specific crank angle, the start of fuel (SOF) can vary, in degrees, as engine speed varies. As a result, the fuel injection period 70 can begin at different crank angles. However, since it ends at a fixed crank angle (EOF), the time duration of the pulse width (PW) 80 can be accurately set and maintained. The fuel air delay (FAD) is the period, measured as an angle of crankshaft rotation, which is the difference between the end of fuel (EOF) point and the start of air (SOA) point.

Figure 4:
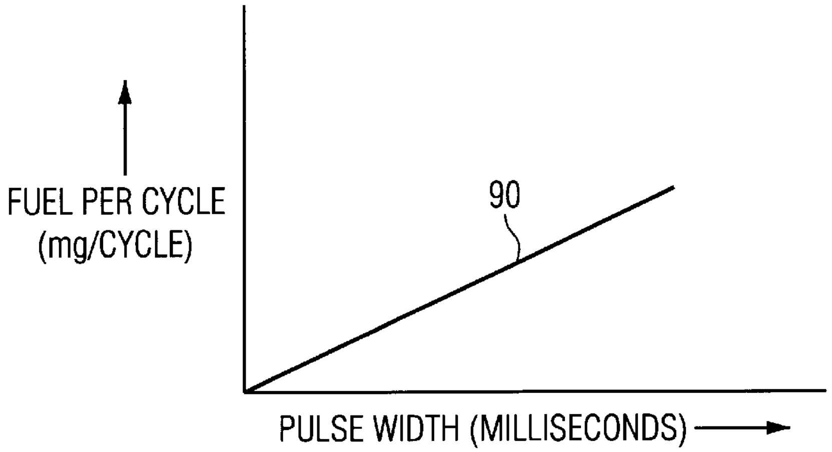
FIG. 4 shows the generally straight line relationship between pulse width and fuel per cycle.

FIG. 4 is a simplified schematic showing the relationship 90 between the pulse width (PW) 80 described above in conjunction with FIG. 3 and the quantity of fuel per cycle (FPC) which is measured in milligrams per cycle. As can be seen in FIG. 4, this is generally a straight line relationship in which the time that rod 48 opens conduit 46 in FIG. 2 is directly related, in a linear manner, to the quantity of fuel F allowed to flow into the cavity 44 in FIG. 2 during that particular cycle of the fuel injection system.

Figure 5A:
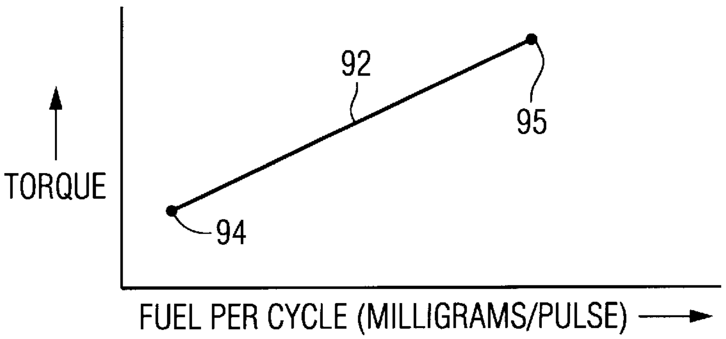
FIGS. 5A and 5B show the torque and RPM, respectively, of an engine as a function of fuel per cycle.
Figure 5B:
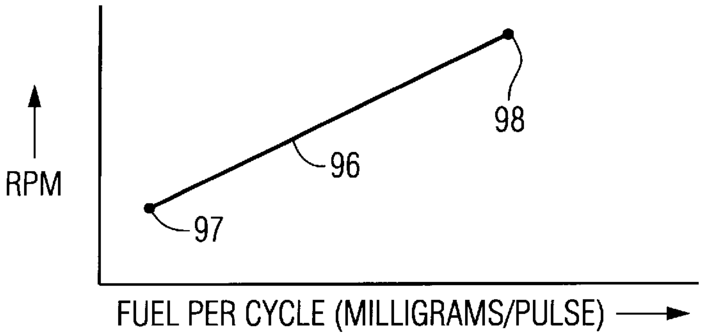

FIG. 5A shows the relationship between fuel per cycle (FPC) and torque. FIG. 5B shows relationship between engine speed (RPM) and fuel per cycle (FPC). With reference to FIG. 5A, it will be described below how the magnitude of fuel per cycle, measured as milligrams per pulse, can change the torque output of an internal combustion engine. It should be noted that the lines in FIG. 5A and 5B are limited to a range between 2 points. For example, the torque line 92 is shown extending between points 94 and 95. Similarly, the engine speed represented by line 96 in FIG. 5B extends between points 97 and 98.

In a marine vessel, the engine speed can vary at a specific torque if the load changes. However, for a constant load, the RPM is predicable based on a knowledge of the torque resulting for any specific magnitude of fuel per cycle. As a result, lines 92 and 96 in FIGS. 5A and 5B are virtually identical. It should be understood, however, that changes in load on the engine of a marine vessel will cause line 96 to deviate from line 92. Although the torque can be accurately predicted as a function of fuel per cycle, prediction of engine RPM as a function of fuel per cycle depends on the load being constant. However, it most marine vessel applications, the load is generally constant during trolling and the predictability of torque allows the accurate prediction of RPM based on a knowledge of the fuel per cycle parameter. In the discussion below, it will be assumed that changes in engine RPM are synonymous with changes in engine torque as a function of fuel per cycle.

Figure 6:
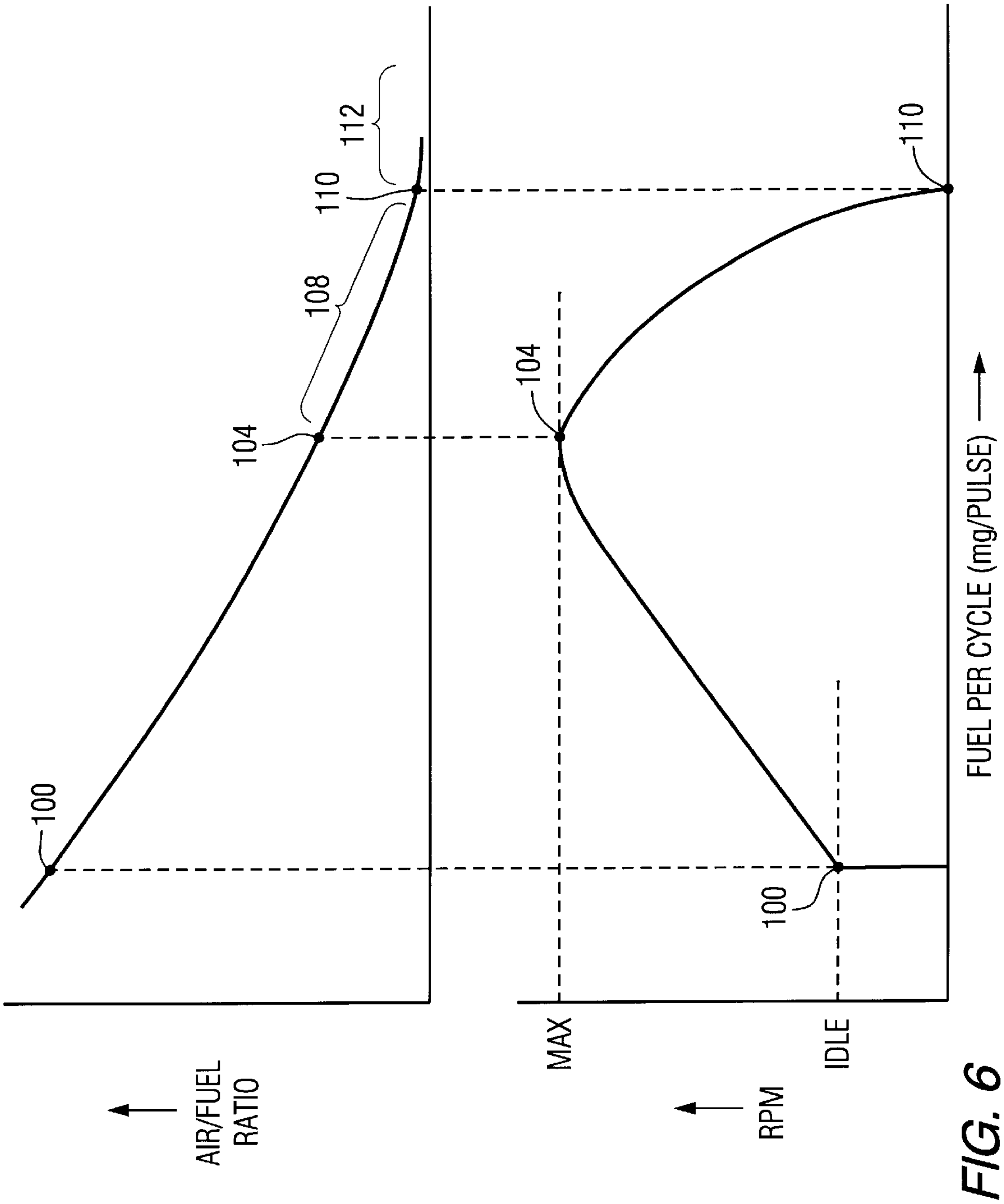
FIG. 6 shows the relationship between the air/fuel ratio and the RPM response to the magnitude of fuel injected per cycle.

FIG. 6 shows graphical representations of the air/fuel ratio and engine RPM, both as a function of fuel per cycle. In other words, the horizontal axes in FIG. 6 represent the length of the fuel per cycle (FPC) which is represented by the pulse width (PW) 80 of the fuel injection 70 in FIG. 3. It can be seen that increased fuel per cycle, measured in milligrams per pulse, decrease the air/fuel ratio from an initial point 100, at which the minimum fuel per cycle to support combustion is initially present, to point 104 which is the rich best torque (RBT) air/fuel ratio. As can be seen, point 104 also results in the maximum RPM for the reasons described above. As the fuel per cycle increases beyond point 104, the air/fuel ratio passes through a region 108 in which the air/fuel ratio is too rich for proper operation and misfire is possible. Eventually, the air/fuel ratio reaches point 110 beyond which the mixture is too rich for combustion to be supported. This region is identified by reference numeral 112.

The graphical representations in FIG. 6 show the relationships, in a stratified charge engine, between fuel per cycle and RPM and also illustrates how the air/fuel ratio relates to the RPM. By selecting the fuel per cycle magnitude, between points 100 and 104 in FIG. 6, the RPM of the engine can be controlled. As can be seen in FIG. 6, the RPM is a straight line relationship with fuel per cycle between points 100 and 104. This direct relationship allows the RPM at idle to be controlled by adjustments in the magnitude of fuel per cycle.

Figure 8:
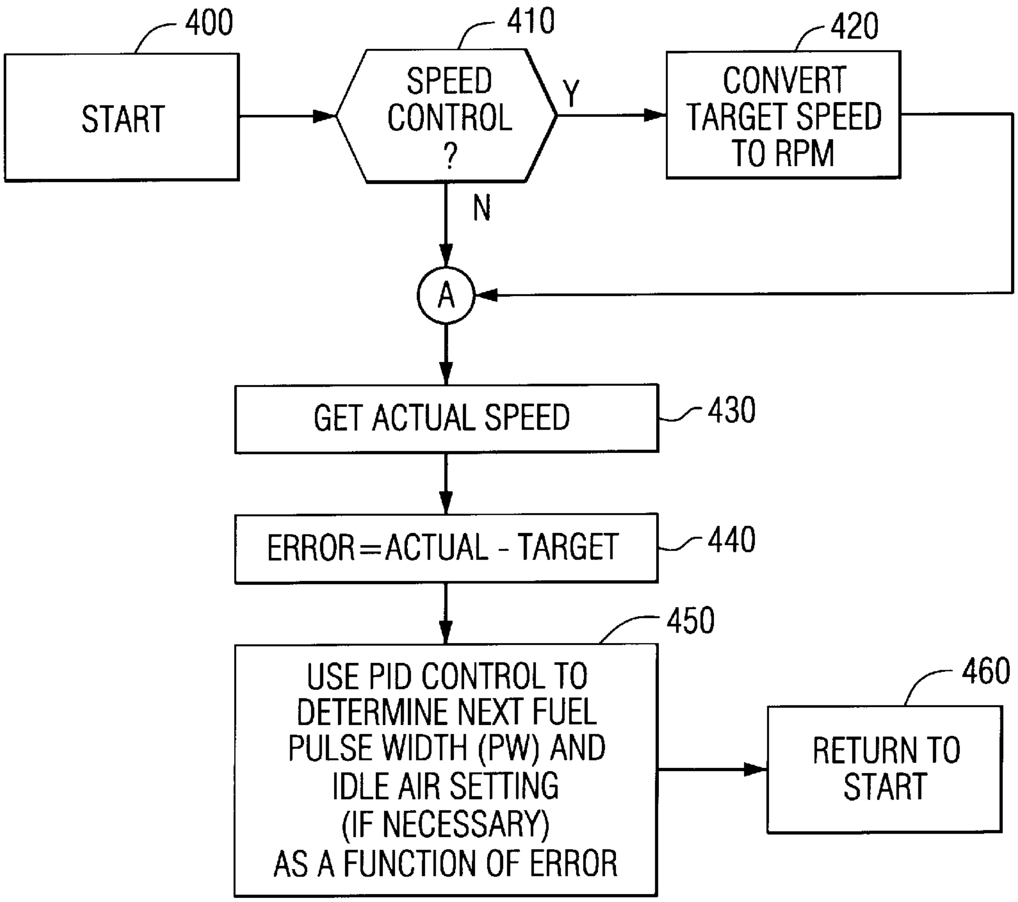
FIG. 8 shows an alternative scheme for implementing one embodiment of the present invention.
Figure 7A:
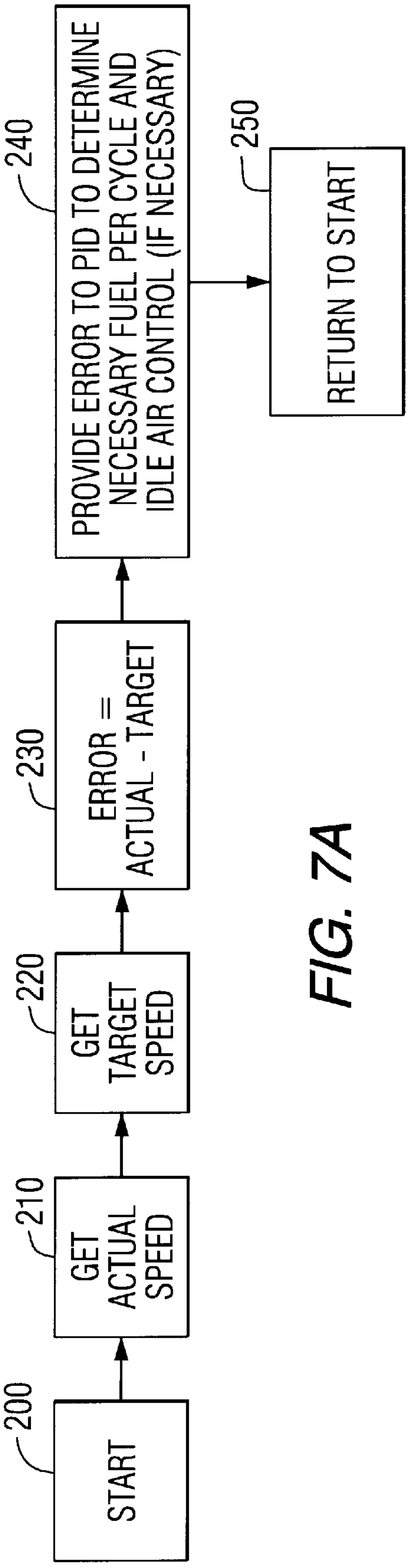
FIGS. 7A and 7B illustrate functional flow charts of software used to implement various embodiments of the present invention.
Figure 7B:
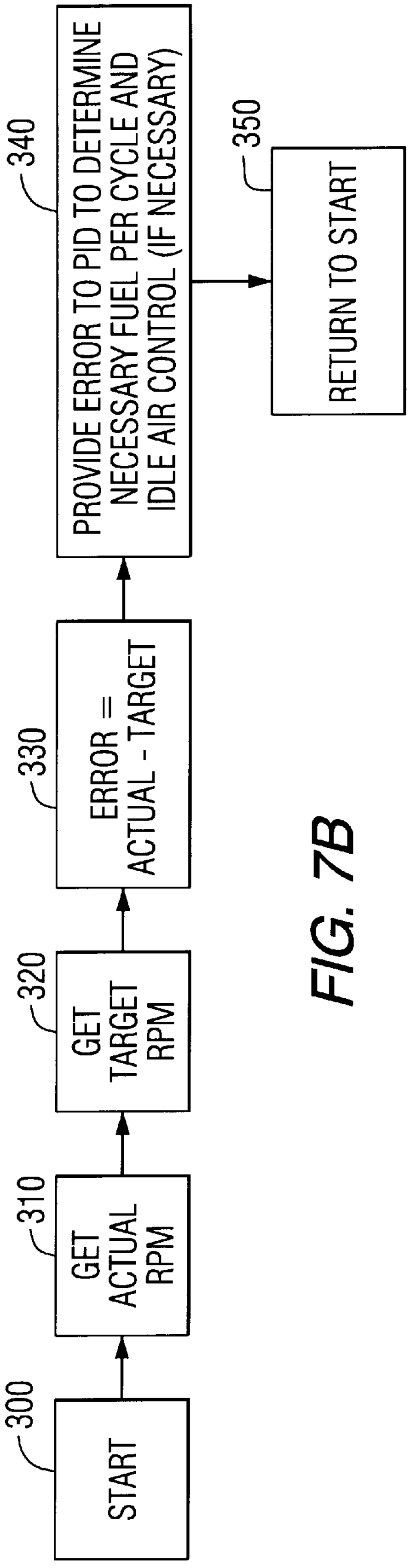

FIGS. 7A and 7B show two preferred embodiments of a control scheme that is able to take advantage of the relationships illustrated in FIG. 6. It should be understood that the simplified flow charts in FIGS. 7 and 8 are highly schematic and represent the general procedural steps of the present invention. In FIG. 7A, the program begins as functional block 200 and proceeds to obtain the actual boat speed at functional block 210. The actual boat speed is obtained from a speedometer which can be a pitot tube speedometer or paddle wheel speedometer. In fact, certain embodiments of the present invention could possibly use one type of speedometer below a certain threshold speed and then use another type of speedometer above that threshold speed. Since certain types of speedometers are more accurate than others at low speed while other types of speedometers are more accurate than others at high speed, this dual speedometer technique can be employed to improve overall accuracy throughout the total speed range of a marine vessel. The actual boat speed would typically be measured in nautical miles per hour or kilometers per hour. The program, at functional block 220, would then obtain a target boat speed. The target speed is initially entered by an operator using an operator interface, such as one or more push buttons. After the operator enters the target speed, that target speed is stored until the operator changes the target speed or moves the throttle handle.

With continued reference to 7A, the functional block 230 compares the actual speed and target speed to determine an error which is then supplied to a proportional-integrated-differential (PID) control algorithm as represented by functional block 240. The PID control software is known to those skilled in the art and determines the appropriate fuel per cycle (FPC) in view of the magnitude and algebraic sign of the error calculated in functional block 230. The result of the PID determination is the magnitude of the pulse width (PW) 80 described above in conjunction with FIG. 3. The magnitude of the pulse width (PW) 80 determines the fuel per cycle and, as described above in conjunction with FIG. 6, determines the appropriate point between points 100 and 104 that will yield the desired boat speed. After making these calculations and determining the appropriate pulse width (PW) 80, the software represented in FIG. 7A returns to the start to recalculate a subsequent error magnitude.

FIG. 7B is similar to the flow chart of FIG. 7A, but it performs the necessary steps to accomplish an alternative embodiment of the present invention. Rather than measuring actual boat speed in nautical miles per hour or kilometers per hour, the software in FIG. 7B measures actual engine speed in revolutions per minute (RPM). After starting, at functional block 300, the software gets the actual is RPM at functional block 310 from an appropriate device such as a tachometer. It then gets the target RPM at functional block 320 by obtaining signals from an operator interface or by obtaining a stored variable from a previously entered operator command. The actual RPM and target RPM are then compared to determine an error magnitude at functional block 330 and this error magnitude is provided to a PID control algorithm at functional block 340. As in the software described in conjunction with FIG. 7A, the appropriate pulse width (PW) 80 is determined and that pulse width (PW) is used to control the fuel per cycle on the subsequent cycle of the fuel injection system. The software then returns to start, as identified by functional block 350 in FIG. 7B.

The primary differences between the software illustrated in FIG. 7A and that illustrated in FIG. 7B is the specific target variable which is used as the control variable in the determination of the magnitude of fuel per cycle. A preferred embodiment of the present invention would provide both options to a marine vessel operator. In other words, the software can be placed in a boat speed control mode which would operate in a manner generally similar to the cruise control function in an automotive application. The operator would select a speed, such as 4.80 nautical miles per hour for example, and the microprocessor of the engine control unit (ECU) would perform the algorithm shown in FIG. 7A to control the engine speed in such a way that the resulting actual boat speed is 4.80 nautical miles per hour. The software would continually compare the results of a speedometer input with the desired target speed to determine whether less or more fuel per cycle is needed to maintain the programmed target speed. The operator could also chose an RPM mode in which the control algorithm represented in FIG. 7B would continually change the magnitude of the fuel per cycle so that the engine RPM is maintained at the target magnitude.

FIG. 8 shows an alternative embodiment of the present invention in which the software would select an appropriate RPM magnitude for a given programmed target speed and then control the engine to that engine speed, measured in revolutions per second, instead of controlling the engine to an actual boat speed. In FIG. 8, the software would begin at functional block 400 and immediately determine whether or not the system is operating in a speed control mode or a RPM control mode. If in a boat speed control mode, the software would convert the speed, measured in nautical miles per hour or kilometers per hour, to an appropriate engine RPM magnitude. This would be done by using a formula or a look up table that provides RPM values for each possible target speed value. This is performed in functional block 420. Once an engine speed variable is selected, either by the operator or by the mathematical conversion of functional block 420, the software would then perform the functional blocks beginning at A in FIG. 8. These steps would include obtaining the actual speed of the engine, measured in revolutions per second, and calculating an error between the actual engine speed and the target speed in functional block 440. The PID control would be used at functional block 450, as described above, and the software would end its calculations for that cycle at functional block 460. It should be understood that, regardless of the particular embodiment of the present invention used to control the speed of the engine or boat, the functional blocks described above in FIGS. 7A, 7B, and 8 which pertain to the PID software would also determine whether an idle air adjustment is necessary. In other words, if the engine is one that operates with a homogeneous charge, it may be necessary to make an idle air adjustment to assure that the fuel per cycle decision made by the PID control software is accompanied by an appropriate idle air determination to assure proper combustion. This additional determination is referenced in functional blocks 240, 340, and 450.

With continued reference to FIGS. 7A, 7B and 8, it should be understood that engines which operate with a stratified charge, such as direct fuel injected engines, typically have sufficient air provided for the combustion in the cylinders regardless of the magnitude of fuel provided per cycle. Although the fuel/air ratio can be decreased to levels that will not support combustion, as described above in conjunction with FIG. 6, stratified charge engines typically operate without regard to the quantity of air provided for combustion. Engines which operate with a homogeneous charge, on the other hand, do not have this capability of operating independently of the quantity of air provided for combustion. Instead, the homogeneous charge provided for combustion must have the appropriate amount of air provided to it. This is usually done through the use of an idle air control mechanism. These devices, described above in conjunction with the background of the present invention, are well known to those skilled in the art and will not be described in detail herein. However, when the present invention is operated with an engine that uses a homogeneous charge, such as a four cycle engine with fuel injected into the intake air stream, an appropriate idle air control device would typically be used. This device would be controlled by the software in conjunction with the PID algorithm described above.

Figure 9:
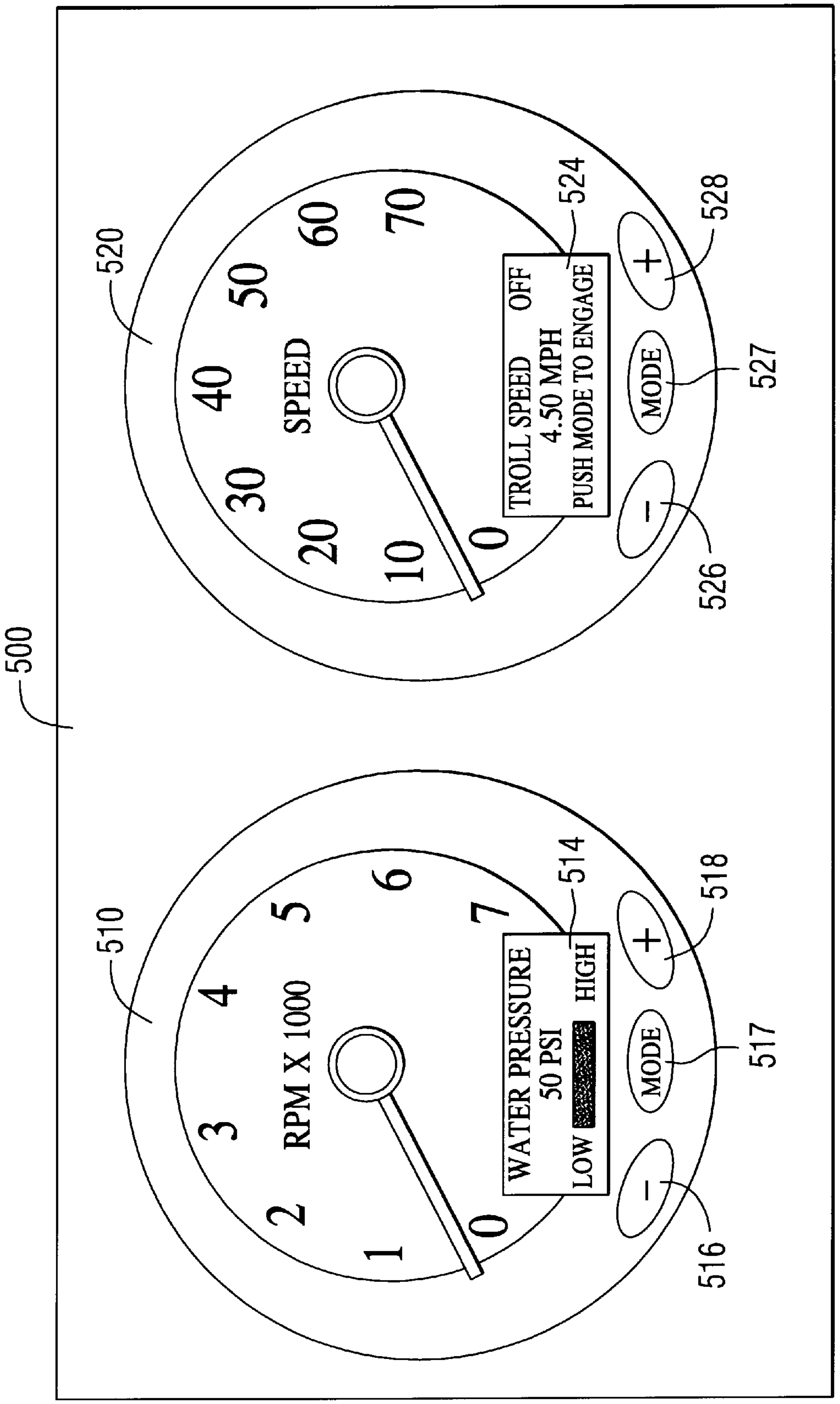
FIG. 9 shows a control panel that can be used as an operator interface to implement the present invention.

Although many different types of operator interface can be used in conjunction with the present invention, FIG. 9 illustrates an exemplary control panel that can serve this purpose. On the left portion of the control panel 500 is a tachometer indicator 510 and on the right half of the control panel is a speedometer indicator 520. The tachometer indicator also has a display 514 which is a liquid crystal display (LCD) in a preferred embodiment. The three buttons, 516, 517, and 518 allow the operator to enter commands to the engine control unit. Many different types of commands are possible using the Mode button 517 and the ± buttons, 516 and 518. The Mode button 517 can be used to select various different displays for the LCD area 514. In addition, the mode button 517 can be used to select an operating option which places the engine control unit in a constant RPM mode. The magnitude of the constant RPM value can be set by using the ± buttons, 516 and 518. The specific methodology by which an operator can enter the desired constant RPM as an idle speed is not limiting to the present invention. Various command protocols can be used to allow the operator of the marine vessel to place the control system in an idle speed control mode, select engine speed (RPM) as the particular control parameter, and then select a particular engine speed by using the ± buttons, 516 and 518.

With continued reference to FIG. 9, the nautical speed indicator 520 also has a LCD display 524 and three control buttons, 526, 527, and 528. The Mode button 527 can be used to select the desired display on the LCD display 524. In addition, the Mode button 527 can be used to place the control system in a speed control mode. The ± buttons, 526 and 528, can then be used to set a particular boat speed, in nautical miles per hour or kilometers per hour.

It should be understood that a typical application of the present invention would include software that would check the position of the manual throttle control to make sure that the operator had placed the throttle in an idle position. If the throttle handle is in an idle position and the marine propulsion system is in gear, the present invention will maintain the boat speed or engine speed, depending on the operator command, to the value selected by the operator. Naturally, the present invention would include an appropriate minimum and maximum limit to either the engine speed or the boat speed selection as the target speed. These minimum and maximum limits would depend on the marine propulsion system and the boat hull design for any particular application. Also, if the operator moves the throttle handle out of its idle position, the present invention would typically abort all constant speed control and respond directly to changes in the position of the throttle handle.

Figure 10:
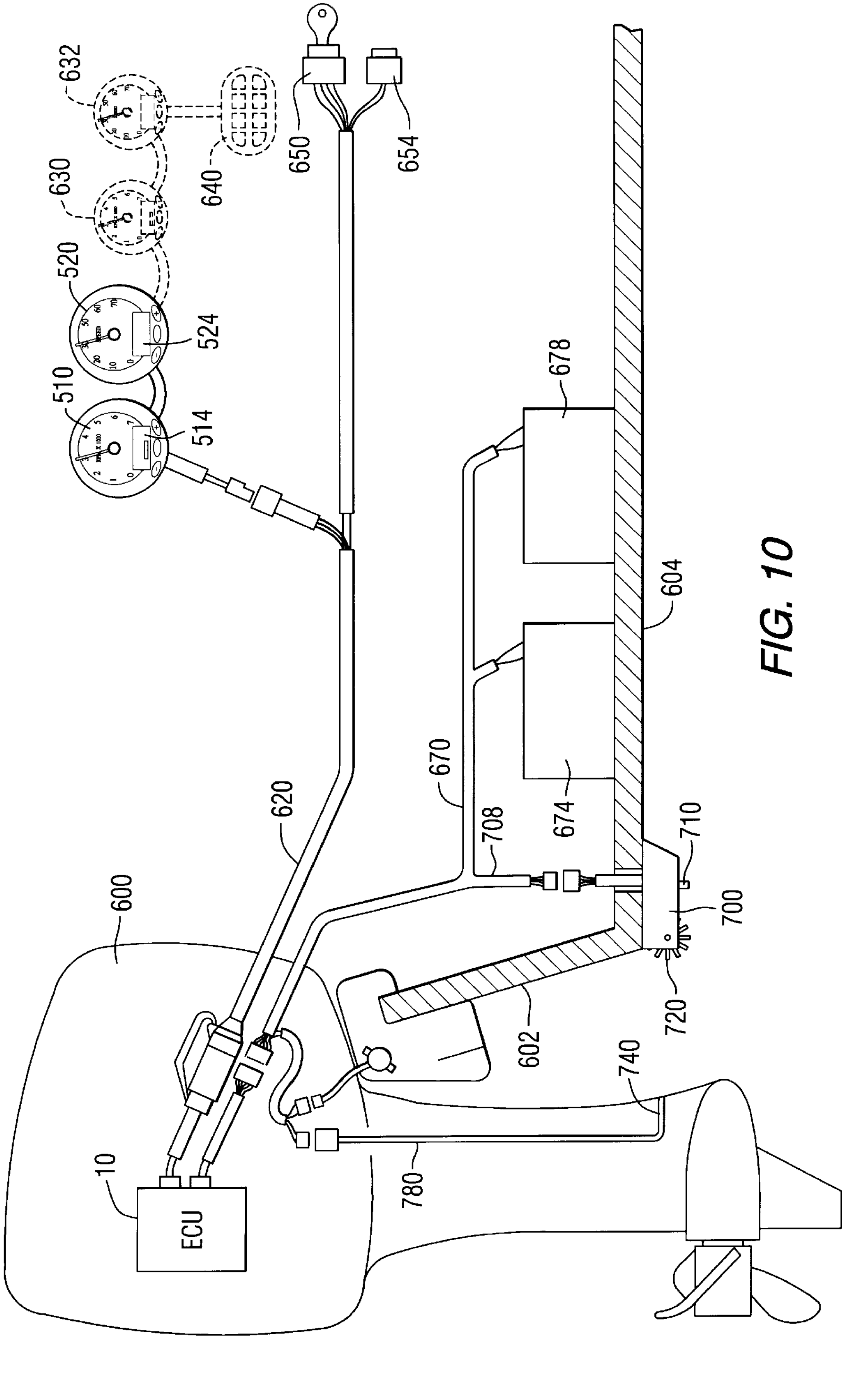
FIG. 10 is a sectional view of a marine vessel with an outboard motor arranged to perform the functions of the present invention.

FIG. 10 illustrates a hypothetical application of the present invention in conjunction with an outboard motor 600 attached to the transom 602 of a boat 604. The engine control unit 10 would typically be located under the cowl of the outboard motor 600. A wire harness 620 would be used to connect the ECU to the tachometer indicator 510 and the speedometer indicator 520. The ECU 10 would also control the LCD displays, 514 and 524, along with any other gauges, 630 and 632, that are used as a part of the boat instrumentation package. A digital keypad 640 could be provided to allow further operator programming or diagnostic commands. The harness 620 also connects the ECU 10 in signal communication with an ignition key 650 and a horn 654. It should also be understood that other alarm devices and input devices could be connected to the ECU via the harness 620. A second wire harness 670 allows the ECU 10 to be connected in signal communication with an oil reservoir 674 and a fuel reservoir 678. This connection allows the ECU 10 to monitor fluid levels and display those levels on the LCD displays, 514 and 524. A transducer package 700 could contain a water temperature sensor 710 and a paddle wheel speedometer 720. The transducer package 700 is connected to the ECU 10 via a harness 708. A pitot-type speed sensor 740 is provided as a portion of the lower gearcase of the outboard motor 600. Signals from the pitot sensor are connected in signal communication with the ECU 10 via cable 780.

With continued reference to FIG. 10, and with reference to FIGS. 7A and 7B, the present invention receives inputs from an operator via an operator interface which can comprise one or more push buttons on the faces of the tachometer display 510 and speedometer display 520 or a plurality of push buttons 640. This target speed, which can be an engine speed (RPM) or a boat speed measured in nautical hours per hour or kilometers per hour, is then compared to actual speeds measured by a tachometer or speedometer. Software in the ECU 10 continually compares the measured speed to the target speed and determines the length (PW) of a fuel injection signal to select the appropriate fuel per cycle (FPC) to maintain the actual speed equal to the target speed. Into alternative modes of the present invention, this idle speed control can use either engine speed or boat speed as a target and as a dependent variable.

Although the present invention has been described in particular detail and illustrated with specificity to show several preferred embodiments of the present invention, it should be understood that alternative embodiments are also within its scope.

I claim:

1. An engine idle control system for a marine propulsion system, comprising:

means for measuring actual speed;

means for receiving a desired speed magnitude, said desired speed being a boat speed magnitude;

means for comparing said actual speed to said desired speed magnitude to determine an error magnitude; and means for controlling a fuel supply to said engine as a function of said error magnitude.

2. The engine idle control system of claim 1, further comprising:

means for converting said desired speed magnitude from said boat speed magnitude to an equivalent engine speed magnitude for use by said comparing means of said engine idle control system.

3. The engine idle control system of claim 1, wherein:

said measuring means is a tachometer associated with a rotating shaft of said engine. desired speed magnitude is received as a boat speed magnitude measured in a distance traveled by said boat per unit time.

4. The engine idle control system of claim 1, wherein:

said measuring means is a speedometer attached to a boat for movement through a body of water with said boat.

5. The engine idle control system of claim 4, wherein:

said speedometer comprises a pitot tube.

6. The engine idle control system of claim 4, wherein:

said speedometer comprises a rotatable paddle wheel.

7. The engine idle control system of claim 1, wherein:

said fuel supply controlling means comprises a means for changing the duration of a fuel injection period.

8. The engine idle control system of claim 1, wherein:

wherein said engine is a fuel injected engine.

9. The engine idle control system of claim 8, wherein:

said fuel is injected directly into a combustion chamber of said engine.

10. The engine idle control system of claim 8, wherein:

said fuel is injected into an air stream flowing into a combustion chamber of said engine.

11. The engine idle control system of claim 1, wherein:

said boat speed magnitude is a function of distance traveled by said boat per unit of time.

12. Method for controlling the idle speed of an engine for a marine propulsion system, comprising:

measuring actual speed;

receiving a desired speed magnitude, said desired speed magnitude being a magnitude of boat velocity;

comparing said actual speed to said desired speed magnitude to determine an error magnitude; and controlling a fuel supply to said engine as a function of said error magnitude.

13. The engine idle control system of claim 12, further comprising:

converting said desired speed magnitude from said boat speed magnitude to an equivalent engine speed magnitude for use by said comparing means of said engine idle control system.

14. An engine idle control system for a marine propulsion system, comprising:

an actual speed measuring device;

an operator interface, said interface comprising one or more input signals representing a desired speed magnitude, said desired speed magnitude being a boat speed magnitude;

a comparator, said comparator having said actual speed measuring device and said operator interface as inputs and an error magnitude as an output, said error magnitude being determined as a function of the difference of said inputs; and a controller, said controller having an output which determines the quantity of fuel provided to a combustion chamber of said engine for each cycle of said engine.

15. The engine idle control system of claim 14, further comprising:

a converter, said converter being configured to convert said desired speed magnitude from said boat speed magnitude to an equivalent engine speed magnitude for use by said comparator.

16. The engine idle control system of claim 14, wherein:

said actual speed measuring device is a tachometer associated with a rotating shaft of said engine.

17. The engine idle control system of claim 14, wherein:

said actual speed measuring device is a speedometer attached to a boat for movement through a body of water with said boat.

18. The engine idle control system of claim 17, wherein:

said speedometer comprises a pitot tube.

19. The engine idle control system of claim 17, wherein:

said speedometer comprises a rotatable paddle wheel.

20. The engine idle control system of claim 14, wherein:

said controller changes the duration of a fuel injection period.

21. The engine idle control system of claim 14, wherein:

wherein said engine is a fuel injected engine.

22. The engine idle control system of claim 21, wherein:

said fuel is injected directly into a combustion chamber of said engine.

23. The engine idle control system of claim 21, wherein:

said fuel is injected into an air stream flowing into a combustion chamber of said engine.

24. The engine idle control system of claim 14, wherein:

said boat speed magnitude is a function of distance traveled by said boat per unit of time.

* * * * *